(12) United States Patent
Chun et al.

(10) Patent No.: US 8,772,369 B2
(45) Date of Patent: Jul. 8, 2014

(54) SINGLE BATCH LATEX INK COMPOSITIONS AND METHODS

(75) Inventors: Doris Pik-Yiu Chun, Sunnyvale, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 46 days.

(21) Appl. No.: 13/384,871

(22) PCT Filed: Dec. 4, 2009

(86) PCT No.: PCT/US2009/066851
§ 371 (c)(1),
(2), (4) Date: Jan. 19, 2012

(87) PCT Pub. No.: WO2011/068521
PCT Pub. Date: Jun. 9, 2011

(65) Prior Publication Data
US 2012/0232215 A1    Sep. 13, 2012

(51) Int. Cl.
*C09D 11/00* (2014.01)
*C08L 33/08* (2006.01)
*C08F 2/22* (2006.01)
*C08F 2/44* (2006.01)
*C08F 4/00* (2006.01)

(52) U.S. Cl.
USPC ........... 523/161; 523/160; 523/200; 523/205; 523/220; 523/221; 524/556; 524/560

(58) Field of Classification Search
USPC ................. 523/160, 161, 200, 205, 220, 221; 524/556, 560
See application file for complete search history.

(56) References Cited

U.S. PATENT DOCUMENTS

| | | | |
|---|---|---|---|
| 6,764,173 B2 | 7/2004 | Chen et al. | |
| 6,848,777 B2 | 2/2005 | Chen et al. | |
| 6,877,850 B2 * | 4/2005 | Ishimoto et al. | 347/100 |
| 7,119,133 B2 | 10/2006 | Vincent et al. | |
| 7,608,646 B1 | 10/2009 | Ganapathiappan et al. | |
| 2003/0008942 A1 | 1/2003 | Ninomiya et al. | |
| 2007/0054979 A1 * | 3/2007 | Hees et al. | 523/160 |
| 2007/0216743 A1 | 9/2007 | Makuta et al. | |
| 2008/0026221 A1 | 1/2008 | Vincent et al. | |
| 2008/0250971 A1 | 10/2008 | Ganapathiappan et al. | |
| 2008/0268250 A1 | 10/2008 | Hawkett et al. | |
| 2008/0269374 A1 * | 10/2008 | Ganapathiappan | 523/201 |
| 2008/0275163 A1 | 11/2008 | Liu | |

FOREIGN PATENT DOCUMENTS

| | | |
|---|---|---|
| CN | 1867638 | 11/2006 |
| EP | 1834997 | 9/2007 |
| WO | WO-2005095531 | 10/2005 |
| WO | WO-2008130631 | 10/2008 |
| WO | WO-2008137347 | 11/2008 |
| WO | WO-2009064278 | 5/2009 |

* cited by examiner

*Primary Examiner* — Satya Sastri

(57) ABSTRACT

The present disclosure provides methods and composition directed towards a single batch latex ink-jet ink. In one embodiment, a method of manufacturing a single batch latex ink-jet ink can comprise emulsifying a pigment and a monomer in a solvent, and polymerizing the monomer with a reaction condition sufficient to encapsulate the pigment and sufficient to form individual latex particulates thereby forming a single batch latex ink-jet ink. The ink can contain less than about 0.5 wt % of latex particulates having a diameter of 50 nm or less, can contain about 1 wt % to about 10 wt % of latex particulates having a diameter of about 100 nm to about 250 nm and can contain about 3 wt % to about 5 wt % of encapsulated pigment.

13 Claims, 1 Drawing Sheet

SINGLE BATCH LATEX INK COMPOSITIONS AND METHODS

BACKGROUND

There are several reasons that ink-jet printing has become a popular way of recording images on various media surfaces, particularly paper and photo media substrates. Some of these reasons include low printer noise, capability of high-speed recording, and capability of multi-color recording. Additionally, these advantages can be obtained at a relatively low price to consumers. With respect to ink-jet ink chemistry, the majority of commercial ink-jet inks are water-based. Thus, their constituents are generally water-soluble, as in the case with many dyes, or water dispersible, as in the case with pigments. Furthermore, ink-jet inks have low viscosity to accommodate high frequency jetting and firing chamber refill processes common to thermal ink-jet architecture.

As ink-jet ink applications have advanced, improvement of such printing systems through ongoing research and developmental efforts continue to be sought.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Figure 1:
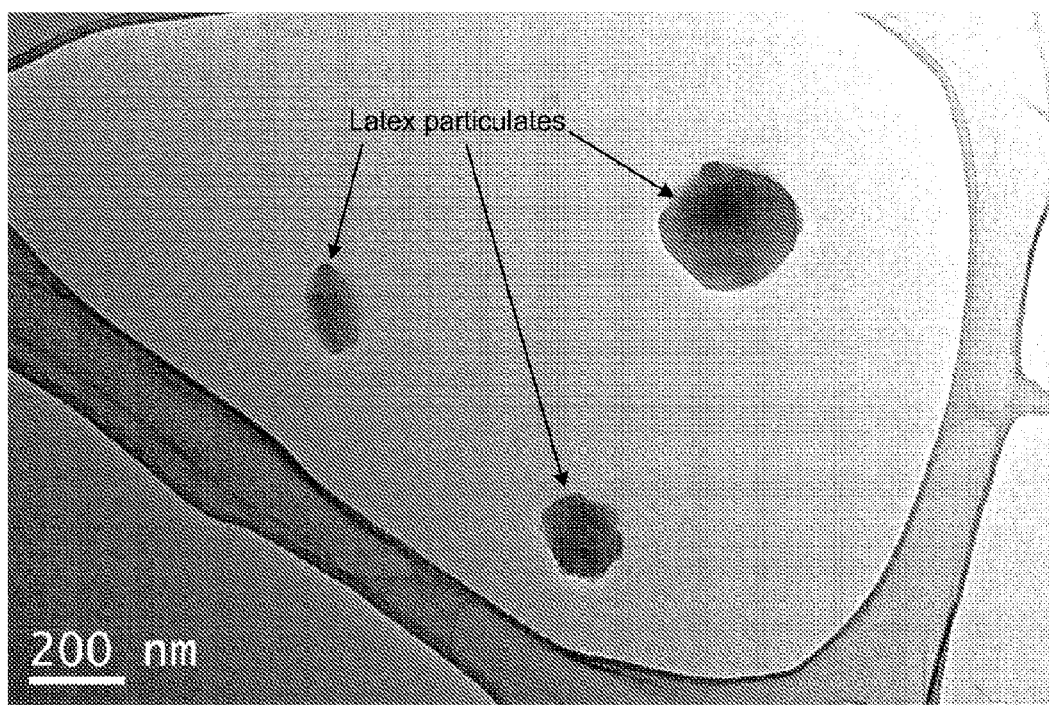
FIG. 1 is a transmission electron microscopy (TEM) image of a single batch latex ink-jet ink in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed or dissolved to form an ink-jet ink. Liquid vehicles are well known in the art, and a wide variety of ink vehicles may be used in accordance with embodiments of the present disclosure. Such ink vehicles may include a mixture of a variety of different agents, including without limitation, surfactants, organic solvents and co-solvents, buffers, biocides, viscosity modifiers, sequestering agents, stabilizing agents, anti-kogation agents, and water. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific embodiment, however, the pigment is a pigment colorant.

As used herein, Tg is the glass transition temperature as calculated by the Fox equation: copolymer $Tg = 1/(Wa/(TgA) + Wb(TgB) + \ldots)$ where $Wa$=weight fraction of monomer A in the copolymer and $TgA$ is the homopolymer Tg value of monomer A, $Wb$=weight fraction of monomer B and $TgB$ is the homopolymer Tg value of monomer B, etc.

As used herein, "substituted" means that a hydrogen atom of a compound or moiety is replaced by another atom such as a carbon chain or a heteroatom, which is part of a group referred to as a substituent. "Substituents" include, for example, alkyl, alkoxy, aryl, aryloxy, alkenyl, alkenoxy, alkynyl, alkynoxy, thioalkyl, thioalkenyl, thioalkynyl, and thioaryl. As used herein, "heteroatom" refers to nitrogen, oxygen, phosphorus, or sulfur.

The terms "halo" and "halogen" refer to a fluoro, chloro, bromo, or iodo substituent.

The term "cyclic" refers to having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

As used herein, "alkyl" refers to a branched, unbranched, or cyclic saturated hydrocarbon group, which typically, although not necessarily, contains from 1 to about 50 carbon atoms, or 1 to about 40 carbon atoms, or 1 to about 30 carbon atoms, for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" refers to an alkyl group having from 1 to 6 carbon atoms. The term "higher alkyl" refers to an alkyl group having more than 6 carbon atoms, for example, 7 to about 50 carbon atoms, or 7 to about 40 carbon atoms, or 7 to about 30 carbon atoms or more. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, lower alkyl, and heteroalkyl.

As used herein, "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon to atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the to breadth of the range or the characteristics being described.

It has been recognized that a single batch latex ink-jet ink can be manufactured without sacrificing performance by controlling the size of the latex as well as the size of the encapsulated pigment. The aforementioned size control is achieved by creating latex particulates and encapsulating pigments within a target size parameter as well as excluding specific amounts of latex particulates and encapsulated pigments outside the target size parameter. Additionally, it has been recognized that the present methods provide significant efficiencies over existing methods, as the present methods do not require multiple separate reactions or the need to acquire latex particles and/or encapsulated pigments prior to ink manufacturing.

In accordance with this, the present disclosure is drawn to compositions and methods, wherein at least one reaction condition of the polymerization is modified to provide a single batch latex ink-jet ink. The composition and method provides specific size parameters for the resulting latex particles and encapsulated pigments. It is noted that when discussing the present methods and associated compositions, each of these discussions can be considered applicable to each of these embodiments, whether or not they are explicitly discussed in the context of that embodiment. Thus, for example, in discussing a monomer for use in a method of manufacturing a single batch latex ink-jet ink, such a monomer can also be used for an ink-jet ink composition, and vice versa.

In one embodiment, a method of manufacturing a single batch latex ink-jet ink can comprise emulsifying a pigment and a monomer in a solvent and polymerizing the monomer with a reaction condition sufficient to encapsulate the pigment and sufficient to form individual latex particulates thereby forming a single batch latex ink-jet ink. Additionally, the method can provide a single batch latex ink-jet ink that contains less than about 0.5 wt % of latex particulates having a diameter of 50 nm or less, that contains about 1 wt % to about 10 wt % of latex particulates having a diameter of about 100 nm to about 250 nm and that contains about 3 wt % to about 5 wt % of encapsulated pigment. Additionally, the present disclosure provides ink-jet inks manufactured by any of the methods described herein.

The present methods and compositions differ from those found in the art that separately synthesize encapsulated pigments and latex particles and then subsequently combine them with appropriate materials to form an ink-jet ink. Specifically, the present method can be carried out to form encapsulated pigments and latexes, which when optionally formulated with other vehicle components, can be directly ink-jetted; i.e., a single batch latex ink-jet ink.

Generally, at least one of a few reaction conditions can be modified to provide a single batch latex ink-jet ink. Various reaction conditions that can influence encapsulation as well as latex particulate formation include modifying the amount of dispersant present, varying the viscosity, modifying the amount of surfactant, and/or varying the initiator loading for polymerization. Thus, it has been recognized that a process for manufacturing a single batch latex ink-jet ink having a specific size profile that allows for direct ink-jetting without the need to separately manufacture the latex from the encapsulated pigment would be a significant advancement in the art.

In one embodiment, the reaction condition sufficient to encapsulate the pigment and sufficient to form individual latex particles having the latex particulate size profiles discussed herein is by decreasing an initiator loading for polymerization by adding a first amount of the initiator to initiate the polymerization and adding a second amount of initiator during polymerization such that the second amount is added over a period of at least 1 hour, and wherein the second amount constitutes at least 30% of total initiator added. In another embodiment, the second amount can constitute at least 40% of total initiator added. In still another embodiment, the second amount can be added over at least a 3 hour period.

In another embodiment related to the reaction condition can relate to viscosity of the emulsion, and in some embodiments, can range from about 40 cP to about 70 cP as compared to a comparative ink that has a more traditional emulsion viscosity of about 25 cP. That being said, it is understood that such a viscosity does not necessarily provide a size profile that can be ink-jetted for every latex. Rather, the present methods can be tailored for any specific combination of latex particles and encapsulated pigments. However, the use of a comparative ink provides an objective determination of the necessary reaction condition; i.e., the reaction condition can be those listed above that can change the size profiles of the latex and encapsulated pigment of a comparative ink into the size profiles of the single batch latex ink-jet ink such that the single batch latex ink-jet ink is ink-jettable.

In addition to the above size profiles, in one embodiment, the single batch latex ink-jet ink can contain less than about 0.1 wt % of latex particulates having a diameter of 50 nm or less and contains about 3 wt % to about 6 wt % of latex particulates having a diameter of about 100 nm to about 250 nm. In another embodiment, the latex particulates can have less than about 5 wt % of latex particles having a diameter of greater than about 500 nm.

For the single batch latex ink-jet ink, the ratio of weight percents of polymer to pigment can be at least 3:1. In one embodiment, the ratio of weight percents of polymer to pigment can be at least 5:1. Additionally, the ratio of the size of the encapsulated pigment to the size of the latex particulates can be 3:1 to 1:3. In one embodiment, the ratio can be about 2:1.

The present methods can include multiple dispersing and emulsifying steps. In one embodiment, dispersing the pigment and monomer can include adding a dispersant. In another embodiment, forming the emulsion can include adding water and a surfactant. Additionally, forming the emulsion can be by microfluidization. In one aspect, the microfluidization can have a liquid shear pressure of 1,000 to 30,000 psi. In another embodiment, forming the emulsion can be by sonication.

Once the polymerization is completed, the single batch latex ink-jet ink can be stored as ready to use. In one embodiment, the single batch latex ink-jet ink can be filtered through a 10 μm screen mesh before use or before storage. In another embodiment, the single batch latex ink-jet ink can be filtered through a 1 μm screen mesh before use or before storage. The pH of the single batch latex ink-jet ink can be about 8 to about 9.

The latex particulates described herein are generally polymerized from latex monomers as known in the art, or in the case of encapsulated pigments, include polymerized latex monomers. In one embodiment, the monomer can include a linear aliphatic, branched aliphatic, or cyclic aliphatic acrylate. In another embodiment, the encapsulated pigment and the latex particulate can include at least one hydrophilic monomer and one hydrophobic monomer.

In one embodiment, the linear aliphatic acrylate, branched aliphatic acrylate, or cyclic aliphatic acrylate can include, but is not limited to, ethyl, propyl, isobutyl, butyl, tertarylbutyl, pentyl, hexyl, heptyl, octyl, nonyl, decyl, dodecyl, octadecyl, 2-ethylhexyl, lauryl, cyclohexyl acrylates, and t butylcyclohexyl. Blends of these monomers with heteroatom containing functional monomers can also be used to enhance and fine tune a desire latex property. These monomers can include, but are not limited to, 2-hydroxyethyl, 2-hydroxylpropyl, 2-hydroxylbutyl, dimethylaminoethyl, glycidyl, butanediol, 2-carboxylethyl, 2-ethoxyethyl, di(ethylene glycol) methyl ether, ethylene glycol methyl ether, ethylene glycol phenyl ether, 2-(4-benzoyl-3-hydroxyphenoxy)ethyl, 2-(dialkylamino)ethyl, 2-(dialkylamino)propyl, 2-[[(butylamino)carbonyl]-oxy]ethyl, 2-hydroxyl-3-phenoxypropyl, 3,5,5-trimethylhexyl, 3-(trimethyloxysilyl)propyl, 3-sulfopropyl, di(ethylene glycol)-2-ethylhexyl ether, dipentaerythritol penta-/hexa, ethyl 2-(trimethylsilylmethyl), ethyl-2-(trimethylsilylmethyl), alkylcyano, ethylene glycol dicyclopentenyl ether acrylates, acrylic acid, methacrylic acid, itaconic acid, fumaric acid, hydroxyethyl acrylate, hydroxylethyl methacrylate, acrylamide, methacrylamide, N-methylol(meth)acrylamide, acrylamidoacrylic acid, acrylamidoethyl(or propyl) methacrylate, 4-vinylpyridinium halide, and any monomer that contains urethane, amide, carbamate, carboxylate, carbonate, pyrimidone, urea, and isothiourea.

The hydrophobic monomer can be present in the polymer from up to 98 wt %, e.g., in one embodiment, from 50 wt % to 98 wt %. Hydrophobic monomers that can be polymerized to form the latex particulate and the encapsulated pigment include, without limitation, styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl to methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, combinations thereof, derivatives thereof, and mixtures thereof.

The hydrophilic monomer can be present in the polymer from up to 10 wt %, e.g., in one embodiment, from 0.5 wt % to 10 wt %. In another embodiment, the hydrophilic monomer can be present from 3 wt % to 7 wt %. Suitable hydrophilic monomers include those containing an ionizable functional group or are otherwise capable of forming an ionic charge after polymerization as well as those that are capable of hydrogen bonding with water or otherwise capable of being solvated in water. In one embodiment, the hydrophilic monomers can be anionic hydrophilic monomers, nonionic hydrophilic monomers, and cationic hydrophilic monomers. As such, hydrophilic monomers can include, without limitation, acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, sulfonic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, 3-sulfopropyl methacrylate, copolymers of polyethylene glycols, poly(ethylene glycol), poly(propylene glycol), copolymers of ethylene glycol, copolymers of propylene glycol, formamides, N-vinyl formamide, acrylamide, methacrylamide, N-vinyl pyrrolidone, water-soluble hydroxy-substituted acrylic or methacrylic esters, hydroxy ethylacrylate, 2-hydroxyethyl methacrylate, methoxypolyethyleneglycol methacrylate, ethyltriethyleneglycol methacrylate, acrylamides, and mixtures thereof. In another embodiment, the hydrophilic monomer can be an acidic monomer. As such, the acidic monomer can be selected from the group consisting of acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, sulfonic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, and derivatives thereof.

Acidic monomers can be present in the polymer from up about 0.1 wt % to about 30 wt. Acidic monomers that can be used in the polymer include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Additionally, the polymerization can include adding a cross-linker. In one embodiment, the crosslinker can be selected from the group consisting of divinylbenzene; ethyleneglycol dimethacrylate; 1,3-butanediol diacrylate; 1,4-butanediol diacrylate; 1,6-hexanediol diacrylate; ethylene glycol diacrylate; glycerol 1,3-diglycerolate diacrylate; pentaerythritol diacrylate monostearate; 1,6-hexanediol ethoxylate diacrylate; 1,6-hexanediol propoxylate diacrylate; bisphenol A ethoxylate diacrylate; bisphenol A propoxylate diacrylate; di(ethylene glycol) diacrylate; poly(ethylene glycol) diacrylate; poly(propylene glycol) diacrylate; tetra(ethylene glycol) diacrylate; and mixtures thereof.

Generally, the polymerization will include an initiator. For example, the monomer mix may also contain oil-soluble initiator such as azobisisobutyronitrile, azobis(cyclohexanecarbonitrile), benzoyl peroxide, and mixtures thereof.

Additionally, the latex particulates and encapsulated pigments can have a Tg ranging from about −40° C. to about 125° C. In one embodiment, the Tg can range from about 15° C. to about 45° C. As discussed above, the present ranges include sub-ranges. For example, the latex particulates and encapsulated pigments can have a Tg from about 0° C. to about 75° C., about 0° C. to about 45° C., about 15° C. to about 75° C., about 20° C. to about 40° C., etc.

In addition to the specific latex particulates and encapsulated pigments described herein, the present methods and compositions can be furthered modified to include known ink-jet ink materials and additives. In one embodiment, the single batch latex ink-jet ink can include an organic co-solvent. Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include to trimethylolpropane, 2-pyrrolidinone, and 1,5-pentanediol.

Additionally, it is noted that the latex particulates and encapsulated pigments described herein can be further stabilized by addition of surfactants. As such, in one embodiment, the latex particulates and encapsulated pigments can further comprise the addition of a reactive surfactant during the polymerization process. Generally, the reactive surfactant contains hydrophobic moieties that can be covalently bound to the surface of the polymeric particles. Additionally, such a reactive surfactant can be incorporated during the polymerization via appropriate organic groups, e.g., a vinyl group, such that the surface of the latex particulates and encapsulated pigments contain the reactive surfactant. Generally, the reactive surfactant can contain hydrophilic groups that allow the latex particulates and encapsulated pigments to be better dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethylene oxide, imidazole and amido groups. As such, in one embodiment, the reactive surfactants cart be functionalized ethylene glycol acrylates, including the SIPOMER® series of surfactants from Rhodia. Other non-limiting examples of reactive surfactants include HITENOL™ (polyoxyethylene alkylphenyl ether ammonium sulfate) and NOIGEN™ (polyoxyethylene alkylphenyl ether) reactive surfactants commercially available from Dai-Ichi Kogyo Seiyaku Co., Ltd. of Japan; TREK) (sulfosuccinates) commercially available from Henkel; and the MAX-EMUL® (anionic phosphate ester) reactive surfactants commercially available from Uniqema of the Netherlands. Suitable grades of some of the materials listed above may include HITENOL BC-20, NOIZEN RN-30, TREM LT-40, and MAXEMUL 6106 and 6112.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation, if included, may range from 0.01 wt % to 10.0 wt %. It is to be noted that the surfactant that is described as being usable in the ink need not be the same as the surfactant that is used during emulsifying or as described as being adhered to the surface of the latex particulates and encapsulated pigments as previously described, though many of the same surfactants ban be used for either purpose.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

The ink-jet ink compositions of the present disclosure may also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof. A non-limiting example of a suitable metal material is a metal in foil form made from, for example, at least one of aluminum, silver, tin, copper, alloys thereof, and/or mixtures thereof.

The following examples illustrate a number of embodiments of the present compositions, systems, and methods that are presently known. However, it is to be understood that the following are only exemplary or illustrative of the application of the principles of the present compositions, systems, and methods. Numerous modifications and alternative compositions, methods, and systems may be devised by those skilled in the art without departing from the spirit and scope of the present systems and methods. The appended claims are intended to cover such modifications and arrangements. Thus, while the present compositions, systems, and methods have been described above with particularity, the following examples provide further detail in connection with what are presently deemed to be the acceptable embodiments.

EXAMPLE 1

Single Batch Latex Ink-Jet Ink

A single batch latex ink-jet ink was made by mixing 10 mL of monomers (styrene, hexylmethacrylate, acrylic acid (40:55:5)) with 0.25 g of AIBN and 5 g of BASF D7086 cyan pigment by mechanical stirring. The resulting paste was subsequently dispersed into a degassed deionized aqueous solution (200 mL) containing 1.5 g sodium dodecyl sulfate also by mechanical mixing until the homogenous suspension was obtained. The resulting suspension further underwent microfluidization (Microfluidics M110-Y) at a pressure of 10,000 psi at a rate of 200 mL/min for 15 minutes. The stabilized emulsion was collected into a reaction vessel equipped with a magnetic stir bar and a condenser, and then heated to 80° C. under a stream of argon. Two hours into the polymerization, an aqueous solution of potassium persulfate (0.2 g in 15 mL water) was added to the reaction dropwise via an addition funnel over the course of 3 hours. The polymerization was allowed to proceed for an additional 3 hours until all monomers were consumed. The newly formed latex ink was allowed to cool to room temperature, and then saturated potassium hydroxide was added to this solution at room temperature with stirring until the pH reached 8.5. The latex ink was then screened through a 20 micron aluminum mesh into a storage bottle until use.

EXAMPLE 2

Comparative Ink

The single batch ink-jet ink having the components of Example 1 was prepared without the continuous addition of potassium persulfate, resulting in a comparative ink having higher percentage of smaller latex particles.

EXAMPLE 3

Data

Figure 2:
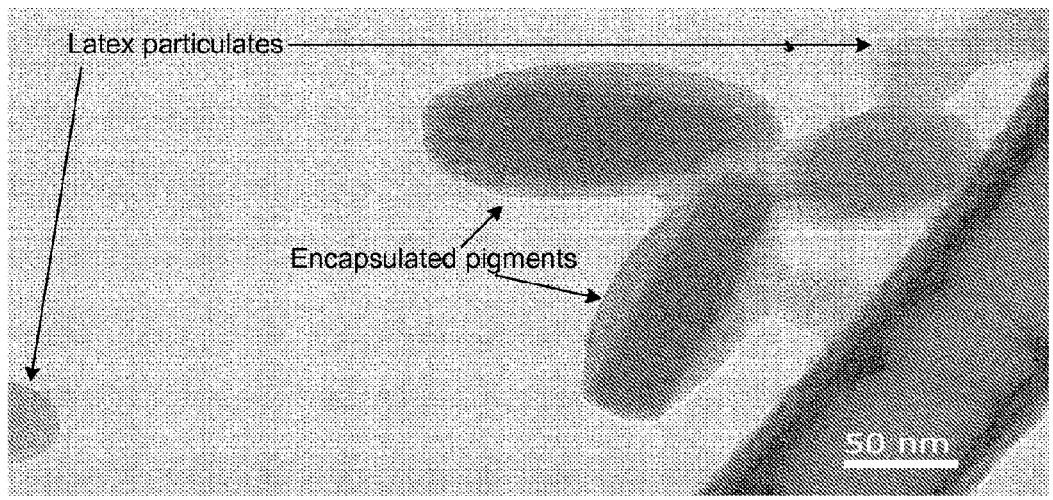
FIG. 2 is a TEM image of a comparative ink.

The ink of Example 1 provided larger latex particles than the comparative ink of Example 2, and further, the ink of Example 1 was ink-jettable without modification. Specifically, the ink of Example 1 contained a significant majority of latex particulates having a diameter of 100 nm to 250 nm, as shown in FIG. 1, while the comparative ink was not ink-jettable due to the large presence of latex particulates having a diameter of 50 nm or less, as shown in FIG. 2.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

The invention claimed is:

1. A method of manufacturing a single batch latex ink-jet ink, comprising:
   emulsifying a pigment and a monomer in a solvent to form an emulsion; and
   polymerizing the monomer with a reaction condition sufficient to encapsulate the pigment and sufficient to form individual latex particulates, wherein the reaction condition sufficient to encapsulate the pigment and sufficient to form individual latex particles is decreasing an initiator loading for polymerization by adding a first amount of the initiator to initiate the polymerization and adding a second amount of initiator during polymerization such that the second amount is added over a period of at least 1 hour and wherein the second amount constitutes at least 30% of total initiator added; thereby forming a single batch latex ink-jet ink that includes less than about 0.5 wt % of latex particulates having a diameter of 50 nm or less, includes about 1 wt % to about 10 wt % of latex particulates having a diameter of about 100 nm to about 250 nm, and includes about 3 wt % to about 5 wt % of encapsulated pigment, wherein the weight percents are based on a total weight of the ink.

2. The method of claim 1, wherein the single batch latex ink-jet ink contains less than about 0.1 wt % of the latex particulates having a diameter of 50 nm or less and contains about 3 wt % to about 6 wt % of the latex particulates having a diameter of about 100 nm to about 250 nm.

3. The method of claim 1, wherein a ratio of polymerized monomer to pigment is at least 3:1 by weight.

4. The method of claim 1, wherein the latex particulates have less than about 5 wt % of latex particulates having a diameter of greater than about 500 nm.

5. The method of claim 1, further comprising filtering the single batch latex ink-jet ink through a 10 μm screen mesh before use.

6. The method of claim 1, further comprising forming the emulsion by microfluidization having a liquid shear pressure of 1,000 to 30,000.

7. The method of claim 1, further comprising dispersing the pigment and monomer by adding a dispersant.

8. The method of claim 1, wherein the emulsion includes water and a surfactant.

9. The method of claim 1, wherein the monomer includes a linear aliphatic acrylate, a branched aliphatic acrylate, or a cyclic aliphatic acrylate.

10. The method of claim 1, wherein the encapsulated pigment and the latex particulates include at least one hydrophilic monomer and one hydrophobic monomer.

11. The method of claim 1, wherein the polymerizing step includes adding a cross-linker.

12. The method of claim 1, wherein the single batch latex ink-jet ink includes an organic co-solvent.

13. The method of claim 1, wherein a size of the encapsulated pigment to a size of the latex particulate is 2:1 to 1:2.

* * * * *